(12) United States Patent  (10) Patent No.: US 8,201,939 B2
Schepke  (45) Date of Patent: Jun. 19, 2012

(54) EYEWEAR WITH FRAME AND REAR PLATE

(75) Inventor: Kyle Schepke, Portland, OR (US)

(73) Assignee: Nike, Inc., Beaverton, OR (US)

( * ) Notice: Subject to any disclaimer, the term of this patent is extended or adjusted under 35 U.S.C. 154(b) by 518 days.

(21) Appl. No.: 12/512,537

(22) Filed: Jul. 30, 2009

(65) Prior Publication Data

US 2011/0025974 A1 Feb. 3, 2011

(51) Int. Cl.
*G02C 1/04* (2006.01)
(52) U.S. Cl. .......................... 351/86; 351/103; 351/106
(58) Field of Classification Search .................... 351/86, 351/83, 103, 106, 105, 107, 108, 109, 124, 351/140, 141, 41
See application file for complete search history.

(56) References Cited

U.S. PATENT DOCUMENTS

| | | | |
|---|---|---|---|
| 2,362,725 A | 11/1944 | Slotsky | |
| 4,317,240 A | 3/1982 | Angerman et al. | |
| 4,810,080 A | 3/1989 | Grendol et al. | |
| 5,790,230 A | 8/1998 | Sved | |
| 5,929,963 A | 7/1999 | McNeal | |
| 6,007,199 A | 12/1999 | Yang | |
| 6,086,199 A | 7/2000 | Holland et al. | |
| 6,196,681 B1 | 3/2001 | Canavan | |
| 6,367,927 B2 | 4/2002 | Yang | |
| 6,517,202 B2 | 2/2003 | Huang | |
| 6,533,412 B1 | 3/2003 | Wang et al. | |
| 6,561,647 B1 * | 5/2003 | Chen | 351/103 |
| 7,452,068 B2 | 11/2008 | Collier et al. | |
| 7,461,935 B2 | 12/2008 | Collier et al. | |
| 7,524,055 B2 * | 4/2009 | Schepke et al. | 351/103 |
| 7,854,507 B1 * | 12/2010 | Chen | 351/103 |
| 2007/0159591 A1 | 7/2007 | Tu | |

FOREIGN PATENT DOCUMENTS

| | | |
|---|---|---|
| FR | 2164074 A5 | 7/1973 |
| FR | 2458089 A1 | 12/1980 |
| WO | 91-11159 A1 | 8/1991 |
| WO | 95-25982 A1 | 9/1995 |
| WO | 2008115729 A1 | 9/2008 |

OTHER PUBLICATIONS

European Search Report issued Dec. 6, 2010 in related European Patent Application No. 10171392.3.

* cited by examiner

*Primary Examiner* — Hung Dang
(74) *Attorney, Agent, or Firm* — Banner & Witcoff, Ltd.

(57) ABSTRACT

Eyewear includes a frame having a right temple arm and a left temple arm and a rearwardly extending lower shoulder. A rear plate has a forwardly extending upper shoulder and a pair of lenses, with a portion of each lens positioned between the frame and the rear plate. The lower shoulder extends beneath the pair of lenses and the upper shoulder extends above the pair of lenses.

19 Claims, 5 Drawing Sheets

EYEWEAR WITH FRAME AND REAR PLATE

FIELD

Aspects of this invention relate generally to eyewear, and, in particular, to eyewear having a frame and a rear plate with removable lenses being positioned between the frame and the rear plate.

BACKGROUND

Eyewear is well known for use in many activities including athletic activities, such as biking, skiing, and running. The user may also wear the eyewear in many different lighting conditions and, therefore, may desire to have different lenses, each set being adapted for use in particular conditions. For example, when outdoors in bright sunlit areas the user may desire a dark lens, or possibly a polarized lens. For low light conditions, the user may desire an amber lens to enhance contrast and light. For conditions with high glare the user may desire yet another type of lens. Additionally, as the lenses become scratched or otherwise marred or damaged, the user may desire to replace the lenses with a fresh set. It is, therefore, desirable for the user to be able to easily remove one pair of lenses and replace them securely with another pair adapted to different lighting conditions, or simply to replace a damaged lens.

The eyewear frames can be formed of various materials. Certain constructions of the frames include plastic or other elastomeric materials, while other constructions may include metal frames. Many frames rely on the flexibility and resiliency of the plastic or elastomeric material to allow lenses to be removed and replaced in snap-fit fashion. Metal frames, however, are less flexible and resilient than plastic frames.

It would be desirable to provide eyewear that allows a user to easily and securely exchange one set of lenses for another in eyewear having a metal frame. It would also be desirable to provide eyewear that reduces or overcomes some or all of the difficulties inherent in prior known devices. Particular objects and advantages will be apparent to those skilled in the art, that is, those who are knowledgeable or experienced in this field of technology, in view of the following disclosure of the invention and detailed description of certain embodiments.

SUMMARY

The principles of the invention may be used to provide eyewear with lenses that are easily removed and replaced. In accordance with a first aspect, Eyewear includes a frame having a right temple arm and a left temple arm and a rearwardly extending lower shoulder. A rear plate has a forwardly extending upper shoulder and a pair of lenses, with a portion of each lens positioned between the frame and the rear plate. The lower shoulder extends beneath the pair of lenses and the upper shoulder extends above the pair of lenses.

In accordance with another aspect, eyewear includes a frame having a right temple arm and a left temple arm and a rearwardly extending lower shoulder. A pair of grooves is formed in an upper surface of the lower shoulder. A rear plate has a forwardly extending upper shoulder and a recess formed in a rear surface thereof. A pair of projections extends downwardly from the upper shoulder. Each lens of a pair of lenses includes a first tab on an upper portion of an inner edge thereof. A second tab is positioned beneath the first tab, with a first recess between the first and second tabs. A second recess is positioned along an upper edge thereof adjacent the first tab, with a portion of each second tab being received in a corresponding groove in the lower shoulder. Each second recess receives a portion of a corresponding projection of the upper shoulder. A nosepiece is positioned behind the rear plate, with a portion of the nosepiece being received in the recess in the rear plate.

In accordance with a further aspect, eyewear includes a metal frame having a right temple arm and a left temple arm and a rearwardly extending lower shoulder. A pair of grooves is formed in an upper surface of the lower shoulder. A rear plate has a forwardly extending upper shoulder and a recess formed in a rear surface thereof. A pair of projections extends downwardly from the upper shoulder and is formed of an elastomer. Each lens of a pair of lenses includes a first tab on an upper portion of an inner edge thereof, a second tab beneath the first tab, a first recess between the first and second tabs, and a second recess along an upper edge thereof adjacent the first tab. A portion of each second tab is received in a corresponding groove in the lower shoulder, with each second recess receiving a portion of a corresponding projection of the upper shoulder. A nosepiece has a pair of arms and is positioned behind the rear plate. A portion of the nosepiece is received in the recess in the rear plate, and a fastener secures the nosepiece and the rear plate to the frame.

By providing eyewear with a frame and a rear plate, according to certain embodiments, lenses in the eyewear can be quickly and safely removed and replaced. This is highly advantageous since it allows a user to easily replace lenses in a metal frame to adapt to different lighting conditions, for example.

These and additional features and advantages disclosed here will be further understood from the following detailed disclosure of certain embodiments.

Figure 1:
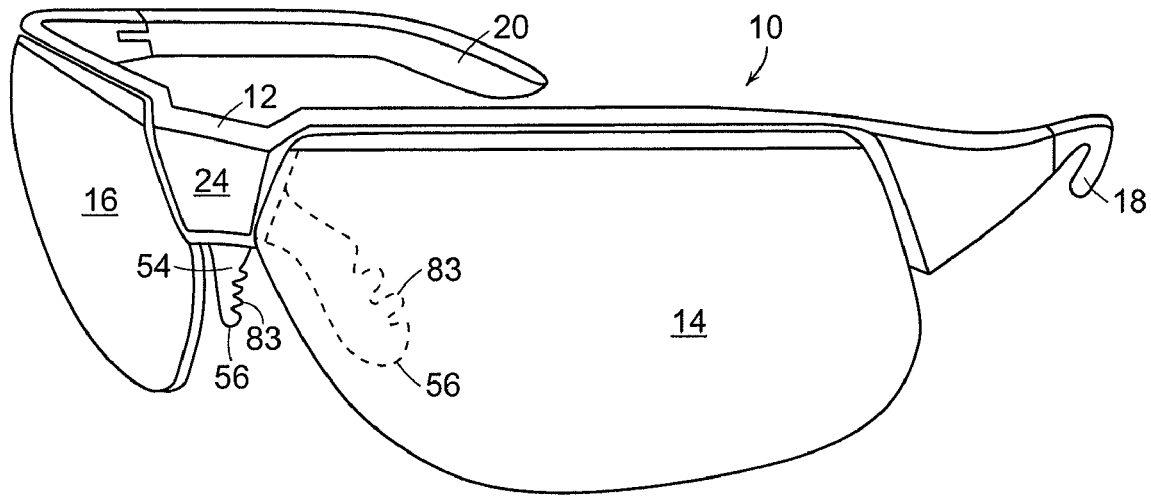
FIG. 1 is a front perspective view of an embodiment of eyewear with a frame, a rear plate, and lenses sandwiched between the frame and rear plate.

The figures referred to above are not drawn necessarily to scale, should be understood to provide a representation of particular embodiments of the invention, and are merely conceptual in nature and illustrative of the principles involved. Some features of the eyewear depicted in the drawings have been enlarged or distorted relative to others to facilitate explanation and understanding. The same reference numbers are used in the drawings for similar or identical components and features shown in various alternative embodiments. Eyewear as disclosed herein would have configurations and components determined, in part, by the intended application and environment in which they are used.

DETAILED DESCRIPTION OF CERTAIN PREFERRED EMBODIMENTS

Figure 2:
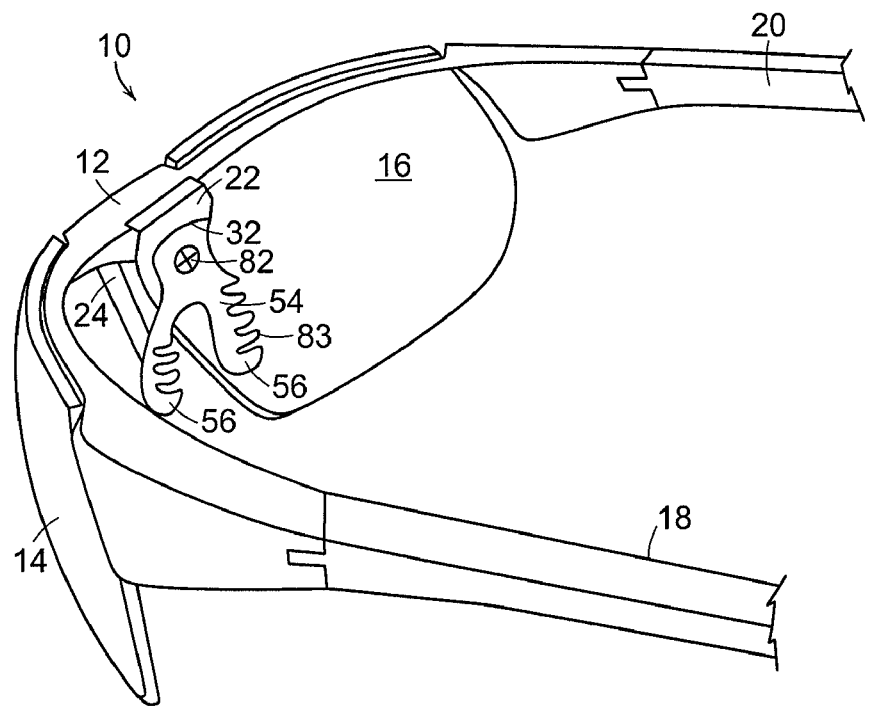
FIG. 2 is a rear perspective view of the eyewear of FIG. 1.
Figure 3:
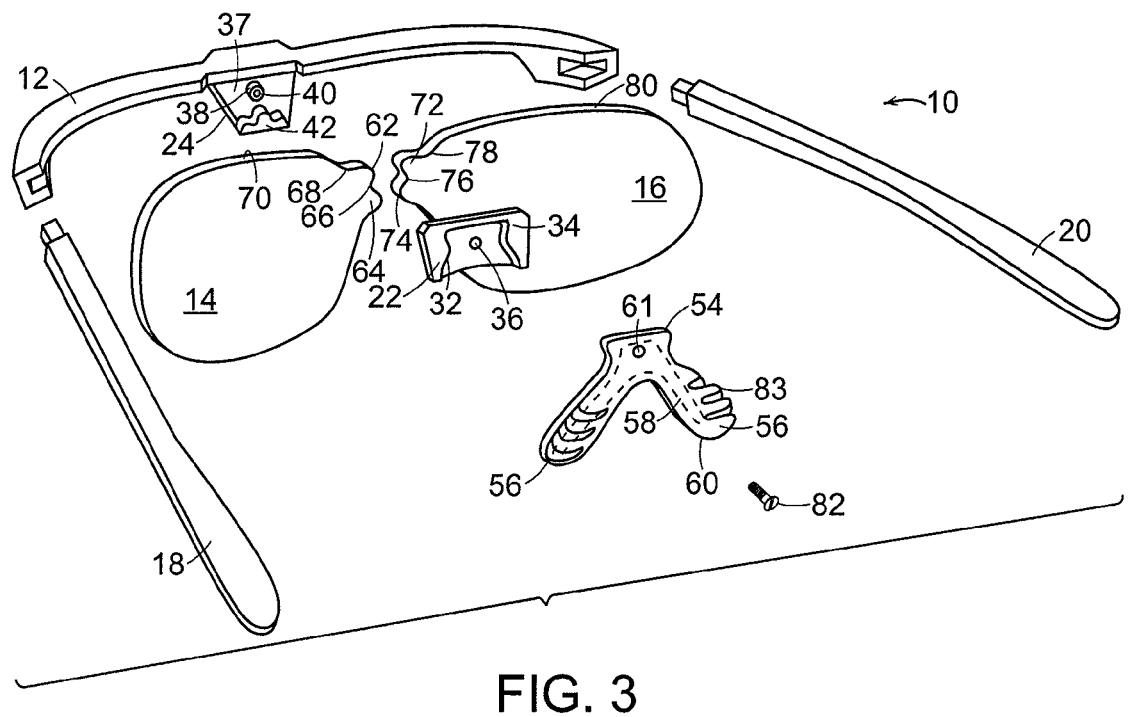
FIG. 3 is an exploded rear perspective view of the eyewear of FIG. 1.

The present invention may be embodied in various forms. A preferred embodiment of eyewear 10 is shown in FIGS. 1-3. It is to be appreciated that eyewear 10 is meant to include not only performance sunglasses and prescription glasses, but rather, all types of glasses, including, for example, safety glasses.

Certain directional terms used herein refer to directions with respect to the wearer of eyewear 10. Thus, the terms outward, outwardly, forward, and forwardly, as used herein, refer to a surface facing away from, or a direction extending away from, or an element spaced from, the face of a wearer of eyewear 10. The terms inward, inwardly, rear, and rearwardly refer to a surface facing toward, or a direction extending toward, the face of a wearer of eyewear 10. The terms left and right are considered to be used with respect to the wearer of eyewear 10. Thus, for example, left of, or to the left, refers to a direction toward the wearer's left.

Eyewear 10 includes a frame 12 and a first or left lens 14, and a second or right lens 16. A first or left temple arm 18 is secured to frame 12. Similarly, a second or right temple arm 20 is secured to frame 12. In certain embodiments, left temple arm 18 and right temple arm 20 are pivotally secured to frame 12. In other embodiments, it is to be appreciated that left temple arm 18 and right temple arm 20 may be rigidly secured to frame 12. In certain embodiments, left temple arm 18 and right temple arm 20 may be formed of the same material as frame 12, or they may be formed of a dissimilar material. In yet other embodiments, left temple arm 18 and right temple arm 20 may be of unitary, that is, one-piece construction with frame 12.

Figure 5:
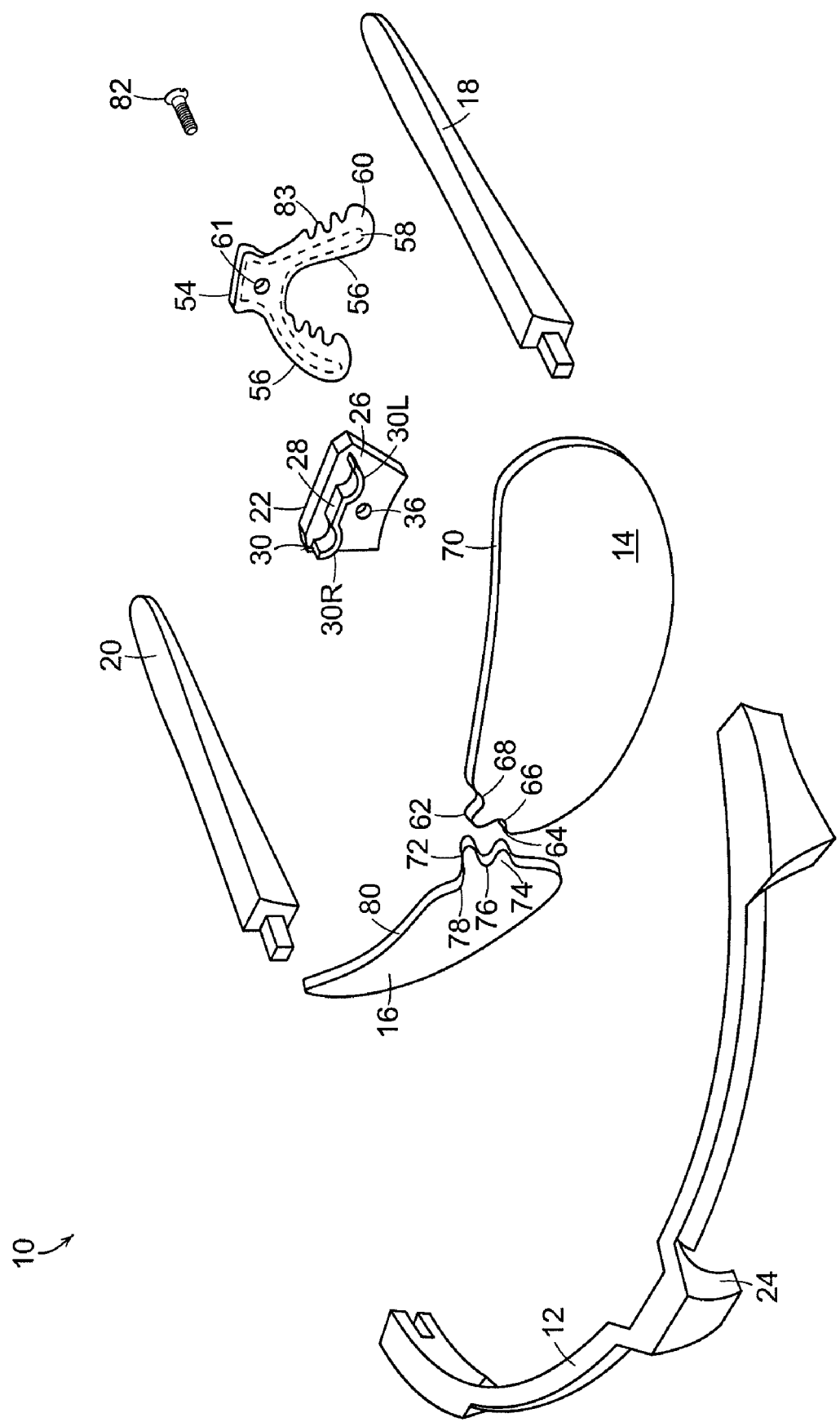
FIG. 5 is an exploded front perspective view of the eyewear of FIG. 1.

A rear plate 22 is positioned behind frame 12. In the illustrated embodiment, rear plate 22 is positioned behind a central portion 24 of frame 12. Central portion 24 in the illustrated embodiment is a portion of frame 12 that extends downwardly in a central area of frame 12. As seen in FIG. 5, a front surface 26 of rear plate 22 includes a forwardly projecting upper shoulder 28. In certain embodiments, upper shoulder 28 includes a pair of projections 30 extending downwardly from upper shoulder 28, namely a left projection 30L and right projection 30R. In the illustrated embodiment, left projection 30L and right projection 30R are substantially semi-circular projections, projecting downwardly.

In certain embodiments, left projection 30L and right projection 30R are formed of a material that is more flexible and resilient than frame 12, which assists in installing and removing first and second lens 14, 16 from eyewear 10 as described in greater detail below. In certain embodiments, left projection 30L and right projection 30R are formed of a rubber or another resilient elastomer material. In certain embodiments, left projection 30L and right projection 30R are formed of a material with a durometer of less than approximately 75 Shore A. In certain embodiments, left projection 30L and right projection 30R are formed of a material with a durometer of approximately 70 Shore A.

A recess 32 is formed in a rear surface 34 of rear plate 22. An aperture 36 forming a through hole extends through a central portion of rear plate 22. In the illustrated embodiment, aperture 36 is a substantially cylindrical aperture, however, it is to be appreciated that aperture 36 can have any desired shape.

A rear surface 37 of central portion 24 of frame 12 includes a rearwardly extending projection 38, with a threaded recess 40 formed therein. In certain embodiments, projection 38 and recess 40 are substantially cylindrical. It is to be appreciated that in other embodiments, projection 38 can have non-cylindrical shapes and still be considered to be within the scope of the present invention.

Figure 4:
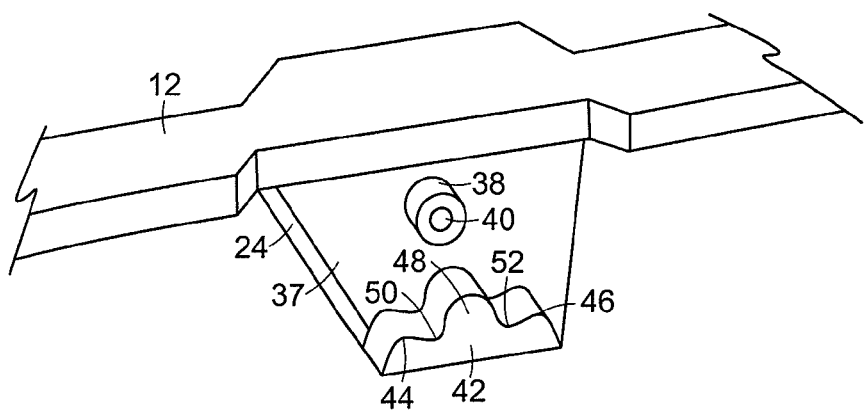
FIG. 4 is an enlarged view of a portion of the frame of the eyewear of FIG. 1.

A lower shoulder 42 extends rearwardly from a lower edge of rear surface 37 of central portion 24. As seen in FIG. 4, a left projection 44 extends upwardly from an upper surface of lower shoulder 42, and a right projection 46 extends upwardly from the upper surface of lower shoulder 42. A central projection 48 extends upwardly from the upper surface of lower shoulder 42 between left and right projections 44, 46. Central projection 48 extends upwardly to a greater extent than each of left projection 44 and right projection 46. In the illustrated embodiment, left projection 44 and right projection 46 project upwardly the same amount. Left projection 44 and central projection 48 define a left groove 50 therebetween. Similarly, right projection 46 and central projection 48 define a right groove 52 therebetween. In certain embodiments, left projection 44 and right projection 46, as well as left groove 50 and right groove 52 are smoothly curved elements.

A nosepiece 54 is secured to frame 12. In the illustrated embodiment, nosepiece 54 is an inverted V-shaped member having a pair of arms 56. A portion of nosepiece 54 is received in recess 32 in the rear surface 34 of rear plate 22, thereby helping to register nosepiece 54 with respect to rear plate 22 and, therefore, frame 12.

In certain embodiments, as seen in FIGS. 3 and 5, nosepiece 54 is formed of an inner portion 58 and an outer portion 60 encasing inner portion 58. In certain embodiments, inner portion 58 may be moldable, allowing arms 56 to be moved to any desired position, thereby allowing the user to customize nosepiece 54 to comfortably sit on the bridge of their nose. Inner portion 58 may be formed of metal, such as sheet metal, or any other suitable material that will allow arms 56 to be moved to desired position and retain that new position once moved there. An aperture 61 forming a through hole extends through nosepiece 54.

Left lens 14 includes a first tab 62 on an upper portion of an inner edge thereof. A second tab 64 is positioned beneath first tab 62. First tab 62 and second tab 64 cooperate to define a first left lens recess 66 therebetween. A second left lens recess 68 is formed in an upper edge 70 of left lens 14 adjacent to first tab 62.

Right lens 16 includes a first tab 72 on an upper portion of an inner edge thereof. A second tab 74 is positioned beneath first tab 72. First tab 72 and second tab 74 cooperate to define a first right lens recess 76 therebetween. A second right lens recess 78 is formed in an upper edge 80 of right lens 16 adjacent to first tab 72.

Nosepiece 54 and rear plate 22 are secured to frame 12 with a fastener 82, such as a screw or bolt. Fastener 82 extends through aperture 61 in nosepiece 54, through aperture 36 in rear plate 22, and is threadingly received in recess 40 in frame 12. A plurality of rearwardly extending fins 83 may be formed on a rear surface of nosepiece 54. Fins 83 rest on the bridge of the user's nose when eyewear 10 is worn by the user, and provide a positive gripping surface, reducing the chance of eyewear 10 slipping off the user's nose, and also provide additional ventilation.

In certain embodiments, frame 12 may be formed of a rigid material, for example, a metal. Exemplary metals include magnesium, stainless steel, aluminum, and titanium. In other embodiments, frame 12 may be formed of a reinforced material such as a carbon fiber composite. In yet other embodiments, frame 12 may be formed of multiple materials, that is, a portion of frame 12 could be formed of a first material, such as a metal, for example, while another portion or portions of frame 12 could be formed of a second material, such as plastic, another elastomeric material, or a reinforced material such as a carbon fiber composite. It is to be appreciated that any portion of frame 12 could be formed of one material while any other portion or portions of frame 12 could be formed of any other material or materials. Other suitable materials for outer frame 12 will become readily apparent to those skilled in the art, given the benefit of this disclosure.

In certain embodiments, rear plate 22 is formed of a plastic or other elastomer. In certain embodiments, rear plate 22 is formed of nylon. Rear plate 22 may also be formed of acrylonitrile butadiene styrene (ABS), cellulose proprionate (CP), or thermoplastic polyurethane (TPU). Other suitable materials for rear plate 22 will become readily apparent to those skilled in the art given the benefit of this disclosure.

Projections 30 may be co-molded with rear plate 22 in certain embodiments. In other embodiments, projections 30 and rear plate 22 may be formed of the same material, and may be formed of unitary, that is, one-piece construction.

Left lens 14 and right lens 16 are removably secured to frame 12 in snap-fit fashion as seen in FIGS. 6-9. The following description discusses the installation and removal of left lens 14 with respect to frame 12. It is to be appreciated that right lens 16 is installed in and removed from frame 12 in the same manner and, therefore, a separate discussion of the installation and removal of right lens 16 is not provided herein.

Figure 6:
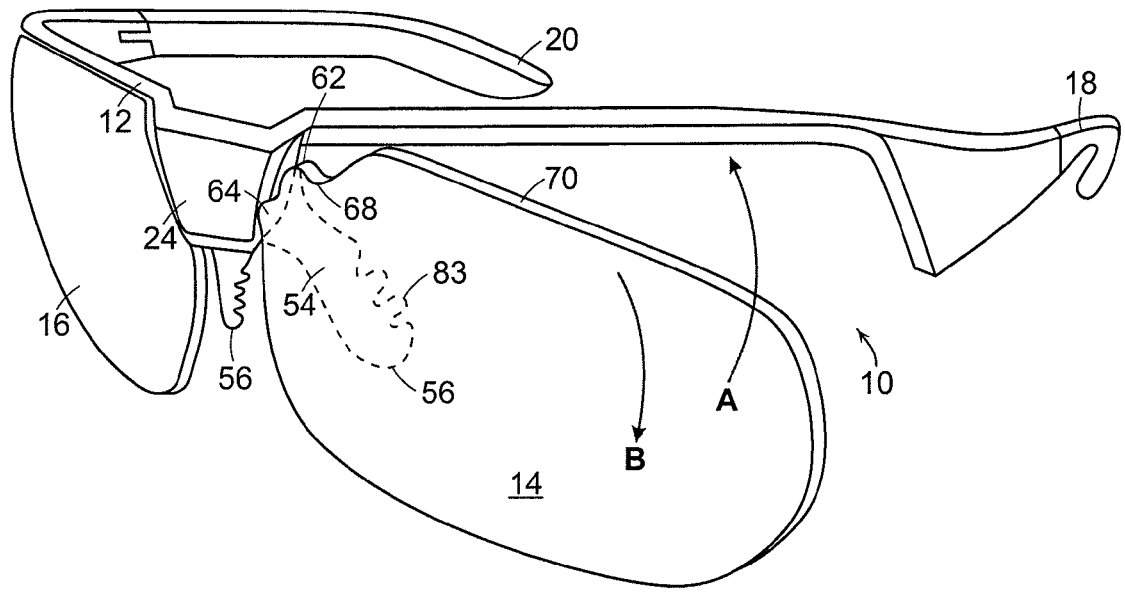
FIG. 6 is a front perspective view of the eyewear of FIG. 1, shown with one of the lenses partially assembled with the frame.
Figure 7:
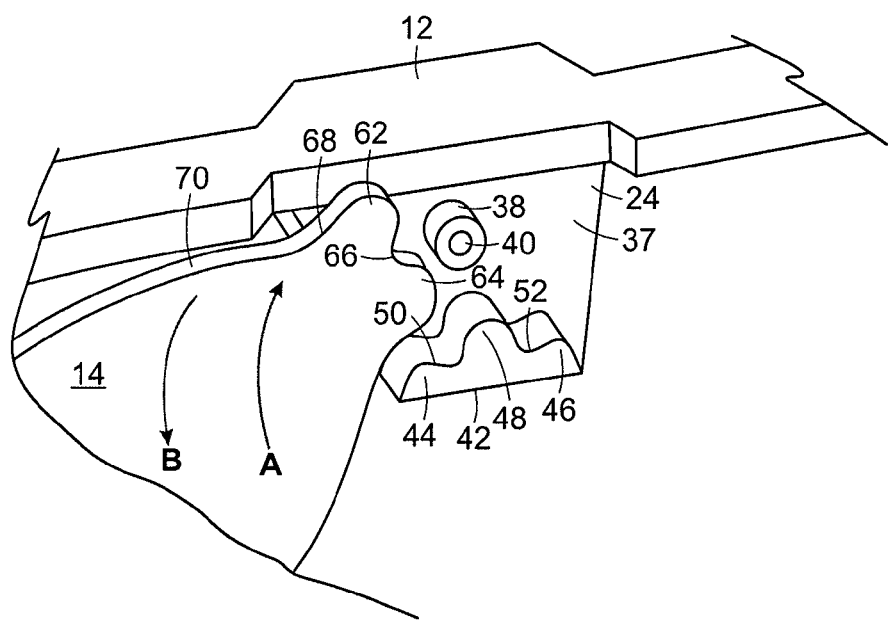
FIG. 7 is an enlarged rear perspective view of a portion of the eyewear of FIG. 1, shown with one of the lenses partially assembled with the frame.

To assembly eyewear 10, nosepiece 54, rear plate 22, and frame 12 are secured to one another with fastener 82. Left lens 14 is then inserted into eyewear 10 by initially positioning left lens 14 at an angle with respect to frame 12, with first tab 62 and second tab 64 angled upwardly toward frame 12, as seen in FIGS. 6-7. Second tab 64 of left lens 14 is then slid inwardly between central portion 24 of frame 12 and rear plate 22 such that second tab 64 is seated at least partially within left groove 50 of shoulder 42. At this point, first tab 62 is not engaged within central portion 24 of frame 12 or rear plate 22.

Figure 8:
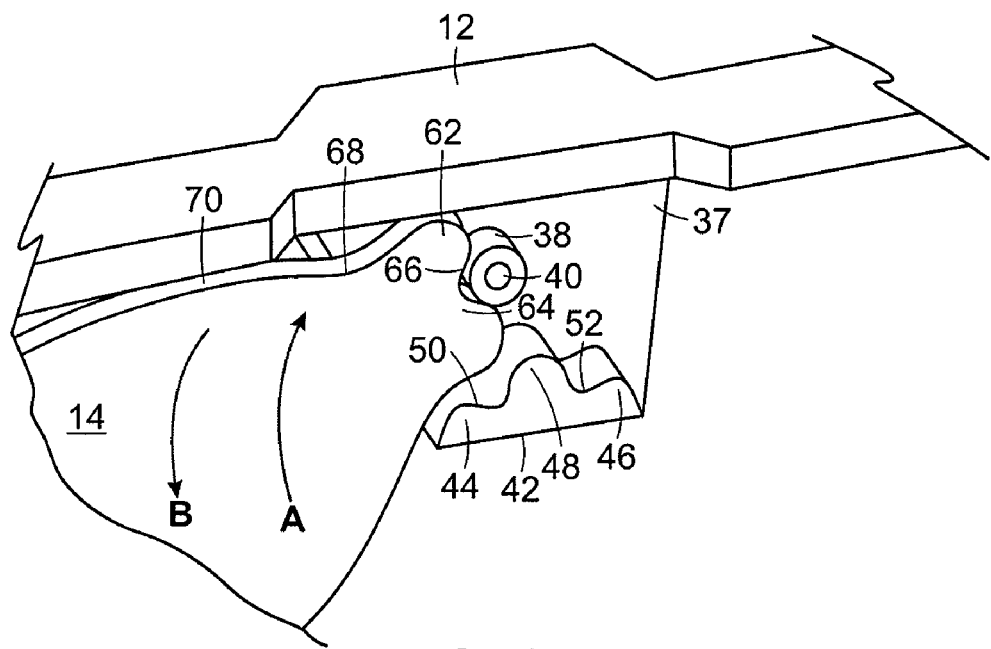
FIG. 8 is an enlarged rear perspective view of the eyewear of FIG. 7 shown with the one of the lenses completely assembled with the frame.
Figure 9:
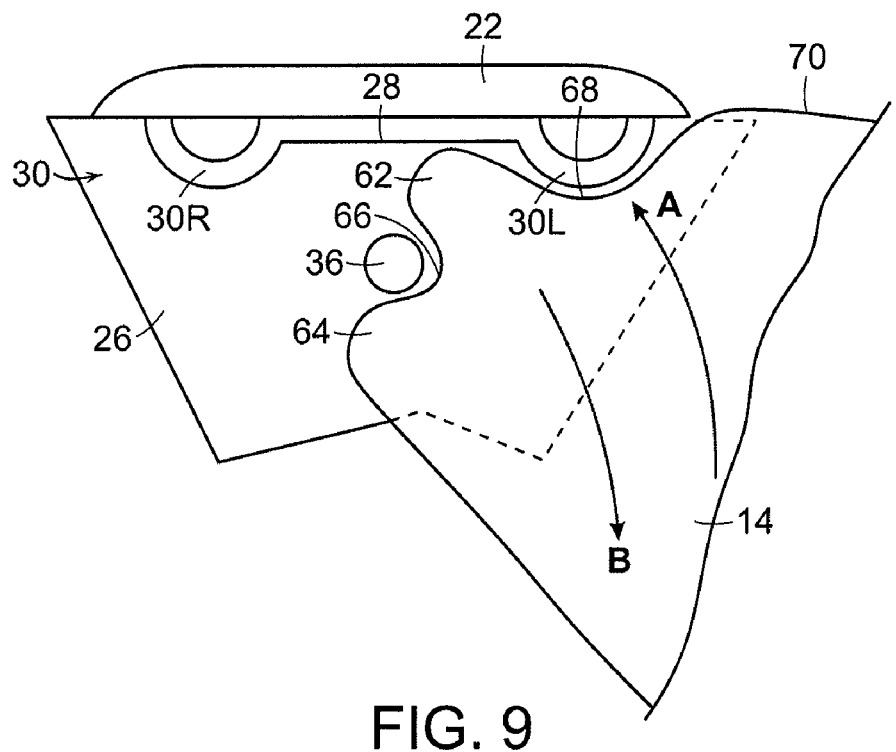
FIG. 9 is an enlarged view of a portion of the rear plate of the eyewear of FIG. 1, shown with one of the lenses partially assembled with the rear plate.

To completely install left lens 14, as seen in FIGS. 8-9, left lens 14 is pivoted upwardly and inwardly in the direction of arrow A, allowing first tab 62 to slide in between central portion 24 of frame 12 and rear plate 22. As left lens 14 is pivoted, first tab 62 engages left projection 30L, and as the user exerts sufficient pressure as left lens is pivoted, first tab 62 snaps into place past left projection 30L in snap-fit fashion, as seen in FIG. 9. The resiliency and flexibility of left projection 30L of rear plate 22 provides first tab 62 with the ability to pass left projection 30L into its installed position.

In the fully inserted or installed position, first left lens recess 66, which is positioned between first tab 62 and second tab 64, receives a portion of projection 38 of central portion 24 of frame 12, as seen in FIG. 8. Left projection 30L is seated in second left lens recess 68, and second tab 64 is seated in left groove 50.

Thus, left lens 14 is securely seated within frame 12 of eyewear 10. Specifically, left lens 14 is seated on shoulder 24 (second tab 64 being seated in left groove 50 of shoulder 24); beneath shoulder 22 (left shoulder 30L is seated in second left lens recess 68); behind central portion 24 of frame 12, and in front of rear plate 22. Consequently, left lens 14 is securely sandwiched or captured between central portion 24, rear plate 22, upper shoulder 22, and lower shoulder 42.

To remove left lens 14, the user simply grasps left lens 14 and pivots it downwardly and outwardly in the direction of arrow B. As left lens 14 is pivoted, first tab 62 engages left projection 30L. The resiliency and flexibility of left projection 30L allows 62 to to pass left projection 30L as the user exerts some pressure on left lens 14, thereby releasing the engagement of left lens 14 with the components of eyewear 10.

Thus it can be seen that left lens 14, and naturally, right lens 16, can easily be removed from and inserted into the remaining components of eyewear 10. This allows a user to be able to easily and securely remove the lenses, and insert an alternate pair of lenses in their place. This allows a user to conveniently be able to replace the lenses of eyewear 10 to adapt to different lighting conditions, or replace damaged, e.g., scratched, lenses with a new set.

Thus, while there have been shown, described, and pointed out fundamental novel features of various embodiments, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. Eyewear comprising:
   a frame having a right temple arm and a left temple arm and a rearwardly extending lower shoulder;
   a rear plate having a forwardly extending upper shoulder; and
   a pair of lenses, a portion of each lens positioned between the frame and the rear plate, the lower shoulder extending beneath the pair of lenses and the upper shoulder extending above the pair of lenses.

2. The eyewear of claim 1, wherein each lens includes a first tab on an upper portion of an inner edge thereof, a second tab beneath the first tab, a first recess between the first and second tabs, and a second recess along an upper edge thereof adjacent the first tab.

3. The eyewear of claim 2, further comprising a pair of grooves formed in an upper surface of the lower shoulder, each groove receiving a portion of a corresponding second tab of the pair of lenses.

4. The eyewear of claim 2, further comprising a pair of projections extending downwardly from a lower surface of the upper shoulder, each projection being received in a corresponding second recess of the pair of lenses.

5. The eyewear of claim 4, wherein the projections are formed of an elastomer.

6. The eyewear of claim 4 wherein the projections have a durometer of less than about 75 Shore A.

7. The eyewear of claim 4, wherein the frame is formed of metal.

8. The eyewear of claim 1, further comprising a recess formed in a rear surface of the rear plate, a portion of the nosepiece being received in the recess.

9. The eyewear of claim 1, further comprising:
   a nosepiece positioned behind the rear plate; and
   a fastener securing the nosepiece and the rear plate to the frame.

10. The eyewear of claim 9, wherein the nosepiece includes a core portion and an exterior portion encasing the core portion.

11. The eyewear of claim 10, wherein the core portion is formed of sheet metal.

12. Eyewear comprising:
   a frame having a right temple arm and a left temple arm and a rearwardly extending lower shoulder;
   a pair of grooves formed in an upper surface of the lower shoulder;
   a rear plate having a forwardly extending upper shoulder and a recess formed in a rear surface thereof;
   a pair of projections extending downwardly from the upper shoulder;
   a pair of lenses, each lens including a first tab on an upper portion of an inner edge thereof, a second tab beneath the first tab, a first recess between the first and second tabs, and a second recess along an upper edge thereof adjacent the first tab, a portion of each second tab being received in a corresponding groove in the lower shoulder, each second recess receiving a portion of a corresponding projection of the upper shoulder; and
   a nosepiece positioned behind the rear plate, a portion of the nosepiece being received in the recess in the rear plate.

13. The eyewear of claim 12, wherein the projections are formed of an elastomer.

14. The eyewear of claim 13, wherein the frame is formed of metal.

15. The eyewear of claim 12, wherein the projections have a durometer of less than about 75 Shore A.

16. The eyewear of claim 12, further comprising a recess formed in a rear surface of the rear plate, a portion of the nosepiece being received in the recess.

17. The eyewear of claim 12, further comprising a fastener securing the nosepiece and the rear plate to the frame.

18. Eyewear comprising:
   a metal frame having a right temple arm and a left temple arm and a rearwardly extending lower shoulder;
   a pair of grooves formed in an upper surface of the lower shoulder;
   a rear plate having a forwardly extending upper shoulder and a recess formed in a rear surface thereof;
   a pair of projections extending downwardly from the upper shoulder and formed of an elastomer;
   a pair of lenses, each lens including a first tab on an upper portion of an inner edge thereof, a second tab beneath the first tab, a first recess between the first and second tabs, and a second recess along an upper edge thereof adjacent the first tab, a portion of each second tab being received in a corresponding groove in the lower shoulder, each second recess receiving a portion of a corresponding projection of the upper shoulder;
   a nosepiece having a pair of arms and being positioned behind the rear plate, a portion of the nosepiece being received in the recess in the rear plate; and
   a fastener securing the nosepiece and the rear plate to the frame.

19. The eyewear of claim 18, wherein the projections have a durometer of less than about 75 Shore A.

\* \* \* \* \*